US010177490B2

(12) United States Patent
Michelmann et al.

(10) Patent No.: US 10,177,490 B2
(45) Date of Patent: Jan. 8, 2019

(54) MAGNETIC CONNECTING APPARATUS

(71) Applicant: Rosenberger Hochfrequenztechnik GmbH & Co. KG, Fridolfing (DE)

(72) Inventors: Folke Michelmann, Tittmoning (DE); Markus Schichl, Seekirchen (AT); Alexander Schuster, Ruhpolding (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 15/523,549

(22) PCT Filed: Nov. 10, 2015

(86) PCT No.: PCT/EP2015/076145
§ 371 (c)(1),
(2) Date: May 1, 2017

(87) PCT Pub. No.: WO2016/078962
PCT Pub. Date: May 26, 2016

(65) Prior Publication Data
US 2017/0310042 A1    Oct. 26, 2017

(30) Foreign Application Priority Data

Nov. 19, 2014 (DE) .................. 10 2014 116 948
Sep. 29, 2015 (DE) .................. 10 2015 116 490

(51) Int. Cl.
*H01R 11/30* (2006.01)
*H01R 13/62* (2006.01)
(Continued)

(52) U.S. Cl.
CPC ....... *H01R 13/6205* (2013.01); *G06F 1/1683* (2013.01); *H01R 35/04* (2013.01); *H04M 1/0216* (2013.01); *G06F 1/1681* (2013.01)

(58) Field of Classification Search
CPC .... H01R 35/04; H01R 13/6205; G06F 1/1683
(Continued)

(56) References Cited

U.S. PATENT DOCUMENTS 531,515 A * 12/1894 Davis ..................... H01R 35/04
439/31
4,657,320 A * 4/1987 Bamford ............... H01R 35/04
439/31
(Continued)

FOREIGN PATENT DOCUMENTS

DE    10 2008 038 649 A1    2/2010
WO       2003/100792 A3    12/2003
(Continued)

OTHER PUBLICATIONS

International Search Report and Written Opinion dated Jan. 27, 2016 issued by the United States Patent and Trademark Office as International Searching Authority in connection with related International Application No. PCT/EP2015/076145 (11 pages).

*Primary Examiner* — Abdullah Riyami
*Assistant Examiner* — Nelson R Burgos-Guntin
(74) *Attorney, Agent, or Firm* — GrayRobinson, P.A.; Donald S. Showalter

(57) ABSTRACT

A preferred embodiment of a magnetic connecting apparatus for connecting two units has at least one first connecting element associated with a first one of the two units and at least one second connecting element associated with a second one of the two units, the connecting elements forming a connecting pair. The connecting elements of a connecting pair each have a plurality of contacts. The connecting elements of a connecting pair make magnetic contact with one another and are rotatable relative to one another in a contacted state.

11 Claims, 9 Drawing Sheets

(51) Int. Cl.
*H01R 35/04* (2006.01)
*H04M 1/02* (2006.01)
*G06F 1/16* (2006.01)

(58) Field of Classification Search
USPC .................................. 439/39, 38, 40, 31, 165
See application file for complete search history.

(56) References Cited

U.S. PATENT DOCUMENTS

| | | | | |
|---|---|---|---|---|
| 4,715,819 A * | 12/1987 | Iwasa | ..................... | H01R 35/04 439/31 |
| 4,850,882 A * | 7/1989 | Yu | ..................... | G01R 31/2808 439/24 |
| 4,863,387 A * | 9/1989 | Snaper | ................... | H01R 35/04 439/13 |
| 4,863,388 A * | 9/1989 | Reimer | ................... | H01R 12/83 439/261 |
| 4,865,553 A * | 9/1989 | Tanigawa | ............... | H01R 35/04 439/31 |
| 5,941,714 A * | 8/1999 | Gorbet | ................ | G06F 15/8023 439/38 |
| 6,272,324 B1 * | 8/2001 | Rudisill | ................. | H01R 35/04 379/433.13 |
| 6,700,784 B2 * | 3/2004 | Huang | ................... | G06F 1/1616 361/715 |
| 6,722,892 B1 * | 4/2004 | Blakelock | .............. | H01R 35/02 439/31 |
| 7,195,492 B2 * | 3/2007 | Schroer | ............... | E05D 11/0081 439/165 |
| 7,214,067 B2 * | 5/2007 | Zaderej | ................ | G06F 1/1616 439/165 |
| 8,047,852 B2 * | 11/2011 | Sip | ........................ | G06F 1/1677 361/679.28 |
| 8,246,357 B2 * | 8/2012 | Chen | .................... | H01R 12/716 439/13 |
| 8,398,409 B2 | 3/2013 | Schmidt | | |
| 8,955,196 B2 * | 2/2015 | Bai | ........................ | E05D 7/0415 16/367 |
| 9,627,803 B2 * | 4/2017 | Szeto | ................. | H01R 13/6205 |
| 2010/0062615 A1 * | 3/2010 | Prest | ..................... | H01R 13/44 439/38 |
| 2010/0197148 A1 * | 8/2010 | Rudisill | ................. | H01R 11/30 439/40 |
| 2010/0285672 A1 * | 11/2010 | Symons | ................ | G06F 1/1616 439/8 |
| 2011/0070747 A1 * | 3/2011 | Ball | .................... | H01R 13/6205 439/39 |
| 2012/0252230 A1 * | 10/2012 | Alameh | .............. | H04M 1/0256 439/31 |
| 2013/0170126 A1 * | 7/2013 | Lee | ....................... | G06F 1/1654 361/679.17 |
| 2014/0273546 A1 * | 9/2014 | Harmon | ............. | H01R 13/6205 439/39 |
| 2014/0342577 A1 * | 11/2014 | De Bruijn | ............ | H01R 12/732 439/31 |
| 2015/0031220 A1 * | 1/2015 | Fang | .................. | H01R 13/6205 439/38 |
| 2015/0188254 A1 * | 7/2015 | Wu | .................... | H01R 13/6205 439/39 |
| 2016/0022030 A1 * | 1/2016 | Scott | ..................... | A47B 21/06 108/25 |
| 2016/0111815 A1 * | 4/2016 | Szeto | ................. | H01R 13/6205 439/39 |
| 2017/0310042 A1 * | 10/2017 | Michelmann | ...... | H01R 13/6205 |

FOREIGN PATENT DOCUMENTS

| | | |
|---|---|---|
| WO | 2010/088695 A1 | 8/2010 |
| WO | 2014/120966 A1 | 8/2014 |

* cited by examiner

MAGNETIC CONNECTING APPARATUS

CROSS REFERENCE TO RELATED APPLICATIONS

This is a U.S. National Phase Entry under 35 U.S.C. § 371 of International Application No. PCT/EP2015/076145 filed Nov. 10, 2015 entitled: MAGNETIC CONNECTING APPARATUS, which designated the United States and at least one other country in addition to the United States and claims priority to German Patent Application No. 10 2015 116 490.6 filed Sep. 29, 2015 and German Patent Application No. 10 2014 116 948.4 filed Nov. 19, 2014.

STATEMENT REGARDING FEDERALLY SPONSORED-RESEARCH OR DEVELOPMENT

Not applicable.

INCORPORATION BY REFERENCE

International Application No. PCT/EP2015/076145, German Patent Application No. 10 2015 116 490.6 and German Patent Application No. 10 2014 116 948.4 are each expressly incorporated herein by reference in their entireties to form part of the present disclosure.

FIELD OF THE INVENTION

The invention relates to a magnetic connection apparatus for connecting two units.

In principle, a magnetic connection apparatus of this kind can be used for establishing any conceivable connection and is therefore particularly suitable for establishing an electrical connection.

BACKGROUND

Mechanical plug connectors are commonly used in the prior art and in practice in order to establish a physical electrical connection between two units. It is possible to mechanically and electrically couple said units to one another either directly or by means of a cable connection in this way. Known problems with plug connections of this kind are wear and ageing phenomena due to repeated disconnection and contact-connection of the plugs until the plugs and/or cables break or the plug connection is permanently damaged in the event of mechanical overloading. Mechanical overloading, for example due to rotation of the units in relation to one another, can easily occur primarily owing to the conventional plug connectors being positioned in a fixed or rigid manner. A more flexible plug connection can be realized only with high levels of technical complexity and therefore expenditure, for example owing to special articulated connections. Furthermore, these measures themselves exhibit wear phenomena owing to frequent loading, as a result of which the service life of the units and/or of the components of said units is correspondingly limited.

In order to solve these problems and avoid the need for rigid mechanical coupling of the plug connectors, magnetic connection apparatuses are known in the prior art. For example, DE 10 2008 038 649 A1 presents an apparatus for establishing a connection between an electrical appliance and a cable which can be connected to the appliance and/or a further electrical apparatus. The apparatus is intended to comprise an adapter having two adapter parts with magnet elements, as a result of which the electrical appliance is connected to a further electrical appliance, for example a charger, a set of headphones, a microphone or a headset. The connection is intended to be made, in a first step, by rough guidance by means of at least one projection and one annular recess, for which reason a correspondingly large amount of play is provided. After the rough guidance, the two adapter parts are exactly positioned and centred in relation to one another in the second step by means of the magnetic forces of the magnet elements.

A significant advantage of this is that the user only has to move the two parts roughly toward one another and does not have to ensure correct contact-connection and assignment of contacts in the process. In this case, connections can also be made quickly and effortlessly in locations which are difficult to access. At the same time, this ensures that, in the event of excessive loading of the connection which could lead to damage to components for example, the connection is released as soon as the magnetic retaining forces are overcome by a higher force from the outside.

The magnetic connection apparatus according to DE 10 2008 038 649 A1 firmly specifies the alignment of the plug elements and/or connection members in relation to one another. Therefore, for example, rotation of the electrical appliances in relation to one another is not tolerated and would necessarily lead to the magnetic and therefore also the electrical connection being opened. The flexibility, for example of a cable connection, is therefore severely limited by the precise specification of the angle of approach. If two electrical appliances, such as mobile electrical appliances, docking stations or input devices for example, are intended to be directly connected to one another, user convenience in particular may be considerably reduced owing to the firmly specified orientation.

It may be advantageous to connect screens, keyboards or other electrical appliances to one another in an articulated or rotatable manner in relation to one another particularly in the case of mobile electrical appliances, such as tablets, portable computers and mobile telephones for example. Articulated mechanical connections (hinges) are known from the prior art for this purpose.

BRIEF SUMMARY OF THE INVENTION

The present invention is based on the object of providing an advantageous articulated or rotatable connection between two units.

This object is achieved by claims 1 and 15.

It is proposed that at least one first connection member is associated with a first unit and at least one second connection member is associated with a second unit, wherein a first connection member and a second connection member form a pair of connections, wherein the connection members of a pair of connections each have a plurality of contacts, wherein the connection members of a pair of connections make magnetic contact with one another, and wherein the connection members of a pair of connections can be rotated relative to one another in the contact-connected state.

The first unit and the second unit are preferably electrical or electronic units. The plurality of contacts are preferably electrical contacts which are intended to transmit data and/or signals and/or to carry current.

The connection members of a pair of connections can be exclusively magnetically connected to one another or, in addition to the magnetic connection, mechanical guidance, preferably rough mechanical guidance, can also be provided in order to make it easier to establish contact between the connection members and therefore between the units.

The magnetic connection apparatus according to the invention for connecting two units is provided, in particular, for releasable connection between two units, that is to say the two units can be temporarily connected to one another and then disconnected again.

The following units can preferably be connected by at least one pair of connections.

(A) two tablets,
(B) two mobile telephones,
(C) one tablet and/or one mobile telephone and/or one electronic unit,
(D) one tablet or one mobile telephone or one electronic unit and a keyboard and/or a screen or a further electronic unit.

According to the invention, a mobile telephone, a tablet or an electronic unit can preferably also be connected to a shell, a docking station, a housing, a cover, a base or a receptacle part.

The magnetic connection apparatus according to the invention is furthermore also suitable for configuring the screen of a portable computer, in particular of a laptop, a notebook or a netbook, in such a way that the screen can be detached from said portable computer.

The magnetic connection apparatus for connecting two units can be formed in such a way that the two units can be connected to one another only in one orientation. This ensures precise and unambiguous connection of the two electrical units. However, as an alternative, provision can also be made, for example, for the two units to be able to be connected to one another in a manner rotated through 180° in such a way that in a first orientation, for example in the case of a laptop, the screen and the keyboard, when they are situated next to one another in one plane, are aligned in the same direction, whereas, in the arrangement which is rotated through 180°, the screen and the keyboard, when they are situated next to one another flat in one plane, are aligned in two directions which differ by 180°. In combination with the fact that provision is made, according to the invention, for the connection members of one pair of connections, by means of which connection members the units are connected to one another, to be able to be rotated in relation to one another, that is to say for the angle between the connected units to be changed, the result is a very flexible and adaptable alignment of the units in relation to one another, which alignment can be matched to the desired intended use.

The invention is not restricted to a rotational movement of the connection members in relation to one another. Other types of movement, from a simple linear movement, through a rotating movement, right up to a complex curved profile of the movement, can likewise be realized.

In contrast to the known prior art, it is possible, owing to the configuration of the connection members according to the invention, to establish an articulated connection between two units, for example an electrical or electronic appliance and a further appliance and/or a cable. In particular, the connected units can be rotated or moved in relation to one another, without the magnetic and/or electrical connection being disconnected. This constitutes a connection which is not only considerably more robust than that known from the prior art, but also considerably increases the operator control convenience for a user. An economically expedient and robust plug connection which has a long service life can be ensured by the solution according to the invention.

According to the invention, provision can be made for the connection members of a pair of connections to each comprise at least one magnet element for making magnetic contact, and for at least one magnet element of a pair of connections to be in the form of a permanent magnet.

The said embodiment is advantageous in order to realize the magnetic contact-connection in a simple and economical manner. In contrast to, for example, a solenoid, the use of permanent magnets means no additional outlay, in particular in the form of electrical energy, has to be invested in the connection or the use thereof. However, a person skilled in the art can provide any other desired realizations of the magnet elements, right up to an electropermanent magnet. The use of an electropermanent magnet can even be particularly advantageous under certain circumstances, since a magnet of this kind can be "programmed" by an electrical pulse and the magnetic force and alignment of said magnet can be varied. As a result, the magnetic connection apparatus is even more adaptable.

A "magnet element" can also mean an element or an arrangement onto which a magnet exerts a magnetic force. For example, a permanent magnet can be provided on a first connection member, and any desired ferromagnetic material, for example a soft-magnetic material, such as iron for example, can be provided on a second connection member.

Both connection members of a pair of connections preferably have permanent magnets.

The permanent magnets are preferably arranged and aligned in such a way that a permanent magnet of a first connection member of a pair of connections makes contact with a permanent magnet of the other connection member of the pair of connections when the units are connected to one another in the intended orientation.

According to the invention, provision can be made for the connection members, the magnet elements and the contacts of a pair of connections to be formed in such a way that, when magnetic contact is made, the contacts of the respective connection members make electrical contact with one another.

According to the invention, provision can be made for contact to be made with the connection members of a pair of connections by means of their casing surface or their periphery. In contrast to this, known magnetic connection apparatuses make contact at the ends.

According to the invention, provision can be made for the connection members of a pair of connections to be able to be rotated in relation to one another by rolling along their casing surface or their periphery in the contact-connected state. In contrast to this, the known end-face magnetic connection apparatuses can be rotated only about the same axis or coaxially.

The axes of the connection members according to the invention of a pair of connections are preferably arranged in parallel but not coaxially. In the event of rotation of the connection members which is possible according to the invention, the axially parallel alignment of the connection members is maintained, while the connection members roll on one another. One axis of a connection member of a pair of connections preferably rotates about the axis of the other connection member. The distance between the axes preferably remains substantially unchanged in the process.

In one embodiment of the invention, the magnet elements can be formed in such a way that electrical and magnetic contact can be made with the connection members of a pair of connections in at least one predetermined orientation and said connection members magnetically attract in this orientation, wherein the connection members of a pair of connections are configured in such a way that the connection members of a pair of connections roll on one another at least over a partial area of the casing surface or the periphery of the connection members in the event of a relative rotation in relation to one another in the contact-connected state, wherein the electrical and magnetic contact-connection is maintained.

The inventors have recognized that rotation of the first unit in relation to the second unit, as is usual, for example, in order to fold open or fold closed the screen of a laptop or to pivot the alignment of said screen in relation to the keyboard, can be implemented in a particularly simple and reliable manner by the connection members according to the invention when the connection members of a pair of connections are configured in such a way that the connection members roll on one another over a partial area of the casing surface or periphery of said connection members in the event of a relative rotation in relation to one another in the contact-connected state. In this case, the connection members and the contacts are configured in such a way that the electrical and the magnetic contact-connection is maintained during the rolling movement.

A movement of the connection members of a pair of connections in such a way that the said connection members roll on one another at least over a partial area of the casing surfaces of the connection members which are aligned with one another can be realized independently of whether the connection between the two units can be closed only in one orientation or whether a second arrangement, which is preferably offset through 180°, or yet further orientations are also possible. Within the scope of the invention, provision is preferably made for the units to be able to be connected to one another in only one orientation or in two orientations. In this case, orientation is intended to be understood to mean the basic connection of the two units, for example whether a screen is aligned with the user or is rotated through 180° and faces in the other direction when connected to a keyboard. Analogously, orientation when two mobile telephones are connected to one another is intended to mean whether the screens of the mobile telephones, during the connection, face in the same direction or in opposite directions when said mobile telephones are situated flat next to one another. The same applies when two tablets are connected or for the connection of a tablet or a mobile telephone to a docking station. The ability to rotate (in particular realized by rolling of the connection members), which results from the connection members according to the invention and which also leads to the ability of the units which are connected to one another to rotate, is provided independently of whether the units can be connected to one another in one, two or several orientations.

According to the invention, provision can be made, as already stated, for the units to be able to be connected to one another in more than one orientation, in particular in precisely two orientations, in particular in two orientations which differ from one another by 180°. This may be suitable, in particular, for connecting keyboards to screens or for connecting two tablets or for connecting two mobile telephones or for connecting a tablet and a mobile telephone to a further electronic unit.

According to the invention, provision may be made for the magnet elements of the connection members of a pair of connections to be aligned in respect of their polarity in such a way that the connection members of a pair of connections magnetically attract only in an orientation of the first unit to the second unit.

At this point, a predetermined orientation means that, for example in the case of two connection members, the contacts of said connection members are provided only in a predetermined assignment to the opposing connection. In particular, it should not be possible to connect the units to one another "in the wrong direction", as a result of which a technical defect can be avoided for example.

According to the invention, provision can also be made in this case for no contact to be made with the magnet elements or for the said magnet elements to experience a magnetic force so as to repel one another in alternative orientations. The repelling magnetic force can indicate to a user that one of the units or one of the connection members has an incorrect orientation. In addition, undesired and unnoticed incorrect contact-connection can be prevented when the units are located in close proximity to one another and can move freely or in an uncontrolled manner, such as during a transportation process for example.

According to the invention, provision can be made for the connection members of a pair of connections to each have at least two magnet elements.

The use of more than one magnet element can advantageously increase a magnetic force effect (retaining force and repelling force) of the magnetic connection apparatus. Furthermore, a specific retaining force can be defined by corresponding selection of the number of magnet elements.

In one embodiment of the invention, provision can be made for the alignment of the poles of the magnet elements or the distribution of the magnet elements themselves on the connection members to specify the predetermined orientation or the predetermined orientations.

Corresponding distribution of the magnet elements or the poles of the said magnet elements over the connection members of the units can be understood to be a kind of coding which defines the desired orientation of the connection members in relation to one another for contact-connection purposes. If each connection member of a pair of connections has two magnet elements, the orientation of the two magnet elements on the respective connection member can be used to define whether the units can be closed only in one or in two orientations or whether only one orientation is magnetically supported or whether two orientations are magnetically supported.

When the two magnet elements of a connection member are arranged symmetrically with respect to the longitudinal axis of the connection member around the centre point or around a cross-sectional area of the connection member which extends through the centre point and the magnet elements are aligned in such a way that in each case the same pole faces inward or the same pole of the two magnet elements faces outward, a connection member in which in each case the opposing poles are identically arranged can be connected in two orientations. By way of example, provision can be made in one connection member for the north poles of the magnet elements to each be aligned outward and therefore for the south poles to be aligned inward, whereas in the other connection member which is to be connected to the said connection member the south poles are aligned outward and the north poles are aligned inward.

When the intended objective of the arrangement of the magnet elements is that of connecting the units only in one orientation, provision can be made either for the magnet elements on the connection members to be arranged asymmetrically in relation to a centre point (as viewed in the axial direction) or for the magnet elements on one connection member to be aligned identically in respect of their poles, that is to say for example the north poles face to the left and the south poles face to the right in each case. In a connection member which is to be connected to the first said connection member, provision is then made for the south poles to be correspondingly aligned to the left and for the north poles to be correspondingly aligned to the right in each case. Therefore, connection of the connection members is possible only in one alignment.

According to the invention, provision can be made for the units which are to be connected to one another to each only have one connection member. In this case, the connection member can have one or two or else several magnet elements.

According to the invention, provision can further be made for the units which are to be connected to one another to each have two or more connection members. In particular, the provision of two connection members per unit has proven advantageous since the units, for example a screen and a keyboard, can therefore be connected in a particularly stable manner. In this case, the connection members can again each have one magnet element or have two or more magnet elements. It has proven advantageous to provide two magnet elements per connection member.

A particularly suitable magnetic connection apparatus is produced when the units which are to be connected each have two connection members with in each case two magnet elements.

The magnet elements of the connection members are preferably each arranged and aligned in such a way that both poles are used to establish the magnetic connection in each magnet element.

According to the invention, provision is preferably made for the magnet elements of the connection members to be aligned in such a way that the poles of the magnet elements are situated next to one another in the axis of the connection member, preferably in such a way that, in the case of a cylindrical or rod-type magnet, the axis of the cylindrical or rod-type magnet is situated in the axis of the connection member. This creates a difference in relation to a known flat arrangement of magnets in the case of which only either the north pole or the south pole is used for connection purposes, while the respectively other pole is averted from the component which is to be connected.

According to the invention, provision can therefore preferably be made for both the north pole and also the south pole to be used for establishing the connection in each magnet element, so that, as illustrated in the drawing, a north pole plate or a south pole plate are situated next to one another in the axis of the connection member and form the magnet element in each magnet element.

Provision can further be made for at least one partial area of the casing surfaces of the connection members on which the connection members of a pair of connections can roll on one another to run in a curved and/or arcuate manner and/or to have a radius. The connection members can preferably have a cross-sectional area at least approximately in the form of a circle. Furthermore, a cross-sectional area in the form of a square or a rectangle with at least one rounded corner or at least one corner which is in the form of an arc of a circle has also proven particularly suitable. As a result, a partial area which runs in a curved and/or arcuate manner and/or has a radius is created in a simple manner.

It is advantageous when the partial area has a uniform curvature or a uniform radius, so that the connection members can roll uniformly on the partial area during rotation of the units in relation to one another.

Owing to a casing surface or surface which is curved and/or arcuate and/or has a radius or a correspondingly configured partial area of the casing surface or surface, it is possible for the connection members of a pair of connections to be able to move on one another in a rolling manner, without releasing the electrical contact-connection. A rolling movement of this kind allows simple realization of the ability of the connection members to rotate or to move which is provided according to the invention. A linear or translatory or other movement is likewise conceivable with corresponding configuration of the connection members.

A further embodiment of the invention can make provision for the connection members of a pair of connections to be formed in a rod-like manner, wherein at least one partial area of the periphery of the respective connection member is formed in such a way that the connection members of a pair of connections can roll on one another.

In this case, provision can be made, in particular, to arrange the magnet elements and/or the electrical contacts next to one another in a longitudinal manner or in the axial direction in a manner distributed along the connection members.

Provision can further be made for the rod-like connection members to have a magnet element at their respective ends, and for the plurality of contacts to be arranged between the magnet elements. It goes without saying that the magnet elements can also be at a distance from the ends of the connection members. Provision can also be made for the magnet elements to be arranged in a manner distributed between the contacts.

The magnet elements and the contacts are arranged in such a way that all of the contact points are closed when there is a magnetic connection. Forming two magnet elements per connection member has proven particularly suitable for this purpose.

The contacts and/or the magnet elements can preferably run in a curved and/or arcuate manner and/or have a radius in the rolling direction of the connection members at least over a partial length or the length of the partial area.

In particular, matching the curvature or the profile or the radius of the magnet elements and contacts to the curvature or the profile or the radius of the partial area, which is provided for rolling, of the casing surface of the connection members can assist the intended movement of the connection members.

Provision can be made for the magnet elements to be formed in a cylindrical and/or disc-like and/or annular and/or partially annular manner.

Magnet elements of this kind can be realized in an expedient manner in respect of production and are suitable for axial arrangement in particular in such a way that both poles of the magnet element can be used in order to establish a magnetic connection. For the purpose of establishing said connection, a commercially available rod-type magnet can, for example, be easily converted into disc form by being shortened and/or cut to size. The cross section of the disc can then—if desired—also be easily broken down into segments of a circle. Furthermore, a ring magnet or an annular magnet element can be formed in a simple manner by making a hole.

In magnet elements which are configured in this way, the respective longitudinal ends then form a pole with respectively opposite polarization.

In a further embodiment, provision can be made for at least some of the contacts of the connection members of a pair of connections, which contacts are aligned with one another and make electrical contact, to make magnetic contact with one another. To this end, at least some of the contacts can be in the form of magnet elements.

Forming the contacts as magnet elements can be economical and reduce the physical size of the magnetic connection apparatus overall since components are saved. However, it is conceivable that a combination of electrical contact and magnet element has an interfering influence on data transmission, in particular data transmission with a high data rate. Accordingly, provision can be made to design only some of the electrical contacts as magnet elements and, in particular, to not realize critical contacts in the form of magnet elements. By way of example, electrical contacts which are used for pure electrical supply purposes, for example power and earth contacts, or for slow data transmission can primarily be in the form of magnet elements.

According to the invention, provision can also be made for the connection members to have magnet elements which do not transmit any electrical signals and in addition for magnet elements which serve for power and earth transmission and/or transmit electrical signals to be provided. According to the invention, provision can also be made for all of the contacts to be in the form of magnet elements. In this case, it is feasible, in a contact pair which allows power, signal or data transmission in the contact-connected state, for one contact to be in the form of a permanent magnet and for it to be possible for the other contact to be only magnetically influenced, for example by realization as a soft-magnetic material, in particular iron.

However, provision is preferably made for the contacts of a contact pair to be formed in a manner corresponding to the above-described magnet elements, so that each contact has two poles which are situated axially next to one another, that is to say the axial ends of an electrical contact which are located in the connection axis have one of the two poles in each case.

As a result, a particularly strong magnetic connection can be established between the contacts of a contact pair, it furthermore being possible for said magnetic connection to be encoded. If a plurality of contacts are in the form of magnet elements, a specific code which allows only a specific connection to a further connection member which has been encoded in a correspondingly matched manner can be produced.

A mechanical preliminary guide is preferably provided for connecting a first connection member to a second connection member.

In one refinement, the connection members of a pair of connections can have a mechanical preliminary guide or a mechanical guide, preferably a mechanical rough guide, for forming a pair of connections.

A mechanical guide assists the connection of the electronic units which are to be connected. In this case, the mechanical guide can preferably be arranged in such a way that it prevents or limits axial displacement of the connection members in relation to one another, as a result of which the magnetic connection is relieved of load and, in particular, no forces or only reduced forces have to compensate for this.

The mechanical guide is preferably configured in such a way that it does not prevent a rolling movement or rolling of the connection members on one another in the contact-connected state. This can be realized, for example, by a connection member of a pair of connections having a raised portion which preferably projects in an arcuate or annular manner or having a projecting partial ring segment, and the associated second connection member of the pair of connections having a corresponding recess which the raised portion, in particular the raised portion which is in the form of part of a ring, can enter. Only a point-like or dome-like raised portion which can then move in a recess, which is in the form of part of a ring, in the respectively other connection member when the connection members roll on one another is also possible.

The mechanical guide can preferably perform two tasks and in this case firstly form a mechanical guide for plug connection of the units and secondly prevent an axial movement of the connection members in the contact-connected state. Furthermore, the mechanical guide can form a mechanical coding in order to prevent incorrect locking.

The mechanical guide is preferably in the form of a mechanical rough guide, for example also formed by a corresponding conical design of the raised portion, so that the mechanical rough guide allows simple guidance of the connection members to one another and exact and precise alignment is then performed by the magnets.

The mechanical rough guide can, in particular, be realized in the form of dome-like structures which project out from a connection member and through corresponding recesses in the connection member which is in the form of a mating piece.

In addition, the mechanical rough guide of the connection member can also be in the form of a magnet element.

A mechanical rough guide of this kind can serve to further increase convenience for a user. Establishing the connection is made easier. Furthermore, a magnet connection which is provided with a mechanical rough guide is robust. Particularly in respect of the possibility which is provided according to the invention of moving or rotating the units or connection members relative to one another, the possibility of contact loss during this movement can be reduced.

According to the invention, provision can be made for in each case two mechanical guide elements, preferably two mechanical rough guide elements, to surround at least one contact.

Owing to a further improved mechanical guide or rough guide of this kind, the possibility of contact-connection loss during a movement of the units in relation to one another is further reduced.

In a further refinement, provision can be made for the electrical contacts to be arranged in a manner recessed in relation to the casing surface or surface of the connection member. This can be realized, for example, in combination with the mechanical rough guide. The electrical contacts can be at least partially surrounded, for example, individually by electrically insulating framing elements and arranged within said framing elements in a recessed manner.

As a result of the electrical contacts on the casing surface or surface of the connection member being formed in a recessed and therefore non-projecting manner, the possibility of unintentional contact-connection is reduced. Electrical contacts of a connection member are also prevented from making unintentional contact with one another, primarily when the connection members make contact with metallic or electrically conductive objects. Therefore, an undesired short circuit can be precluded or at least the possibility of said short circuit can be reduced.

According to the invention, provision can be made for the contacts of the two connection members of a pair of connections to be recessed in relation to the casing surface or surface of the respective connection member. In this case, the electrical contacts can in each case be surrounded at least partially by framing elements and can be arranged within said framing elements in a recessed manner. In this case, provision is preferably made for the framing elements of a connection member to be configured in such a way that the framing elements of the other connection member can enter the first said framing elements in order to allow electrical contact to be made with the electrical contacts which are respectively arranged within the framing elements. On account of the framing elements of a connection member entering a corresponding framing member of a second connection member of the pair of connections, a mechanical guide is additionally provided, the said mechanical guide reliably preventing axial displacement of the connection members in relation to one another.

In one refinement of the invention, provision is made for the framing elements of a connection member to be formed in order to receive the corresponding framing elements of the other connection member. However, it is also feasible for only some of the framing elements of a connection member to be provided for receiving the framing elements of the other connection member, while another number of the framing elements of the connection member themselves enters the framing elements of the other connection member.

In addition, yet further mechanical guides can additionally be provided on the connection members, the said further mechanical guides not serving to border the electrical contacts, as already described above. Furthermore, at least some of the contact elements themselves can also be in the form of magnets and/or further magnet elements which are not provided for making electrical contact can be provided.

Furthermore, provision can be made for connection of the electrical contacts to be assisted by the electrical contacts of at least one of the connection members of the pair of connections being mounted in a radially sprung manner.

One contact is preferably radially pretensioned or sprung in each contact pair.

By virtue of mounting in this way, connection of the contacts can be ensured over a relatively long mechanical path in the radial extent and the contact-connection becomes more reliable. As a result, it is possible to ensure that, in particular, an electrical connection is maintained in spite of shocks or vibrations on the units or the connection members since the contacts can be tracked over a defined radial distance. It goes without saying that a spring arrangement or spring-like apparatus which is mounted in some other way is also feasible depending on the application.

According to the invention, provision can also be made for all of the electrical contacts to be mounted in a radially sprung manner. In principle, a spring arrangement of the contacts can be provided independently of whether said contacts additionally have a magnetic configuration or are in the form of magnets.

The connection members are preferably connected to an electronic unit or to a unit which is to be connected to an electronic unit, or are arranged on the said electronic unit or unit which is to be connected to an electronic unit, or can be connected to the said electronic unit or unit which is to be connected to an electronic unit.

A connection member can have any desired number of contacts, preferably greater than two and less than one hundred, particularly preferably between five and fifty, very particularly preferably between ten and twenty. In one exemplary embodiment, thirteen contacts are provided. In a further exemplary embodiment, however, four contacts are provided.

The number of contacts is dependent on the units which are to be connected; in one refinement, it may also be advantageous when the number of contacts is two to six, and four contacts are preferably provided.

The invention is particularly suitable for an electronic system having at least one first unit and one second unit, wherein the units are connected by means of a magnetic connection apparatus according to one of claims 1 to 14.

A system of this kind can preferably comprise units such as mobile telephones, tablets or other computers, appliance casings and appliance shells, docking stations, covers, keyboards or screens, wherein this list is not intended to be understood as exhaustive.

Details can be gathered from the figures in the drawing, wherein each figure illustrates a separate exemplary embodiment, but two or more of the figures in any desired combination can also illustrate a common exemplary embodiment. All of the features in the figures are optimal and can be combined with one another in any desired manner.

DETAILED DESCRIPTIONS OF PREFERRED EMBODIMENTS

Figure 1:
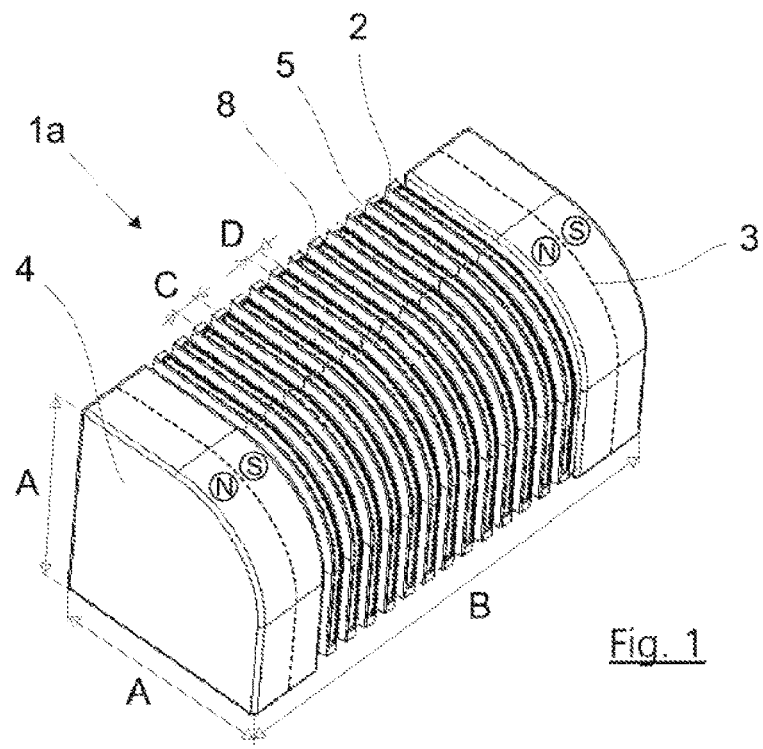
FIG. 1 schematically shows a three-dimensional view of a first connection member of a pair of connections in a first embodiment.

One possible embodiment of a first connection member 1a is illustrated in FIG. 1. In this embodiment, the electrical contacts 2 are surrounded by two magnet elements 3. The magnet elements 3 are located on the two ends of the connection member 1a. In the shown embodiment, the connection member 1a has a cross-sectional area 4 in the form of a square with one rounded corner. The cross-sectional area 4 resembles a segment of a circle, more precisely a quadrant of a circle.

The magnet elements 3 are designed as permanent magnets 3 and can be produced, for example, from a cylindrical magnet. The magnet elements 3 can therefore have poles N, S which are separated in the axial direction. A connection member 1a can have any desired number of contacts 2, preferably greater than two and less than one hundred, particularly preferably between two and fifty, very particularly preferably between ten and twenty. Thirteen contacts 2 are provided in the exemplary embodiment in FIG. 1. Recesses 5 are provided between the contacts 2 in order to allow mechanical preliminary guidance, preferably rough guidance. The contacts 2 themselves are arranged individually within electrically insulated framing elements 8 in a recessed manner.

Figure 2:
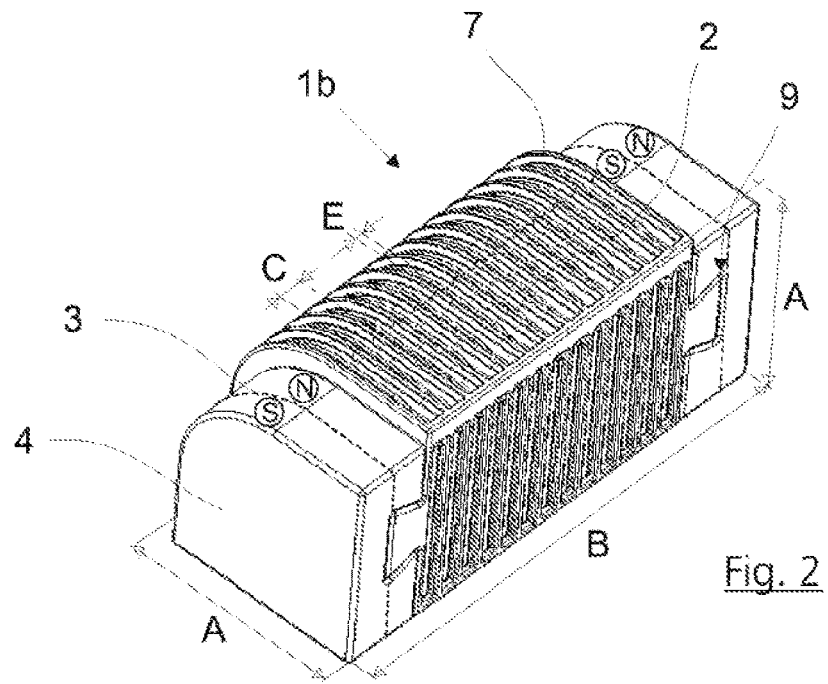
FIG. 2 schematically shows a three-dimensional view of a second connection member of a pair of connections in the first embodiment.

FIG. 2 illustrates a second connection member 1b. This connection member 1b is designed in order to be able to magnetically and electrically form a pair 6 of connections with the first connection member 1a from FIG. 1. However, the thirteen contacts 2 are surrounded by two magnet elements 3 which are in the form of permanent magnets 3. The two permanent magnets 3 each have a north pole and a south pole and are arranged at the ends of the connection member 1b in such a way that one end of the connection member 1b has a polarity N and the other end of the connection member 1b has a polarity S. In this case, the distribution of the poles N, S is selected to complement that of the magnet elements 3 of the first connection member 1a. The arrangement of the magnet elements 3 has the effect that the magnetic force assists the contact-connection of the connection members 1a, 1b only in one orientation.

The said figure also shows the elements for mechanical preliminary guidance, in particular for rough guidance, in an embodiment as projecting, dome-like framing elements 7 in such a way that the framing elements 7 of the connection member 1b in FIG. 2 fit into the correspondingly designed recesses 5 in the connection member 1a in FIG. 1, wherein a certain amount of play can be provided here, so that rough guidance is preferably provided. The dome-like framing elements 7 each encompass an electrical contact 2 of the second connection member 1b in FIG. 2. In this case, the electrical contacts 2 are slightly recessed and are preferably mounted by spring elements.

The dome-like framing elements 7 are configured in such a way that they enter the recesses 5 in the connection member 1a and, in the process, encompass the framing elements 8 of the contacts 2 of the connection member 1a.

One possible way of mounting the magnet elements 3 on the connection members 1a, 1b or the contact part of the connection members 1a, 1b is shown in the form of a dovetail connection 9. Another connection or fastening can also be provided here.

By way of example, the dimensions A-E can be gathered from the connection members 1a, 1b in FIGS. 1 and 2. Although the dimensional relationships of the components in relation to one another are not intended to be understood as being restricted by said dimensions and all of the dimensions can be scaled as desired, some particularly advantageous dimensions are cited in the text which follows. The height or width A of the cross-sectional area 4 or of the end face of the connection member 1a can be approximately 8 mm. The height or width of the cross-sectional area 4 or of the end face of the connection member 1b, including the dome-like framing elements 7 which project in terms of the height and the width, is likewise approximately 8 mm. That is to say, the magnet elements 3 of the second connection member 1b have a height or width which is lower than that of the magnet elements 3 of the first connection member 1a by the projecting portion of the dome-like framing elements 7.

The length B of the connection members 1a, 1b can be approximately 20 mm. The distance C between the centre lines of two contacts 2 can be approximately 1.05 mm. The width D of a contact 2 which can be arranged in the electrically insulating framing element 8 in a slightly recessed manner is preferably approximately 0.3 mm. The width E of the electrical contact 2 of the second connection member 1b which is preferably mounted in a radially sprung manner and is surrounded by the dome-like framing element 7 can be, for example, approximately 0.2 mm.

Figure 3:
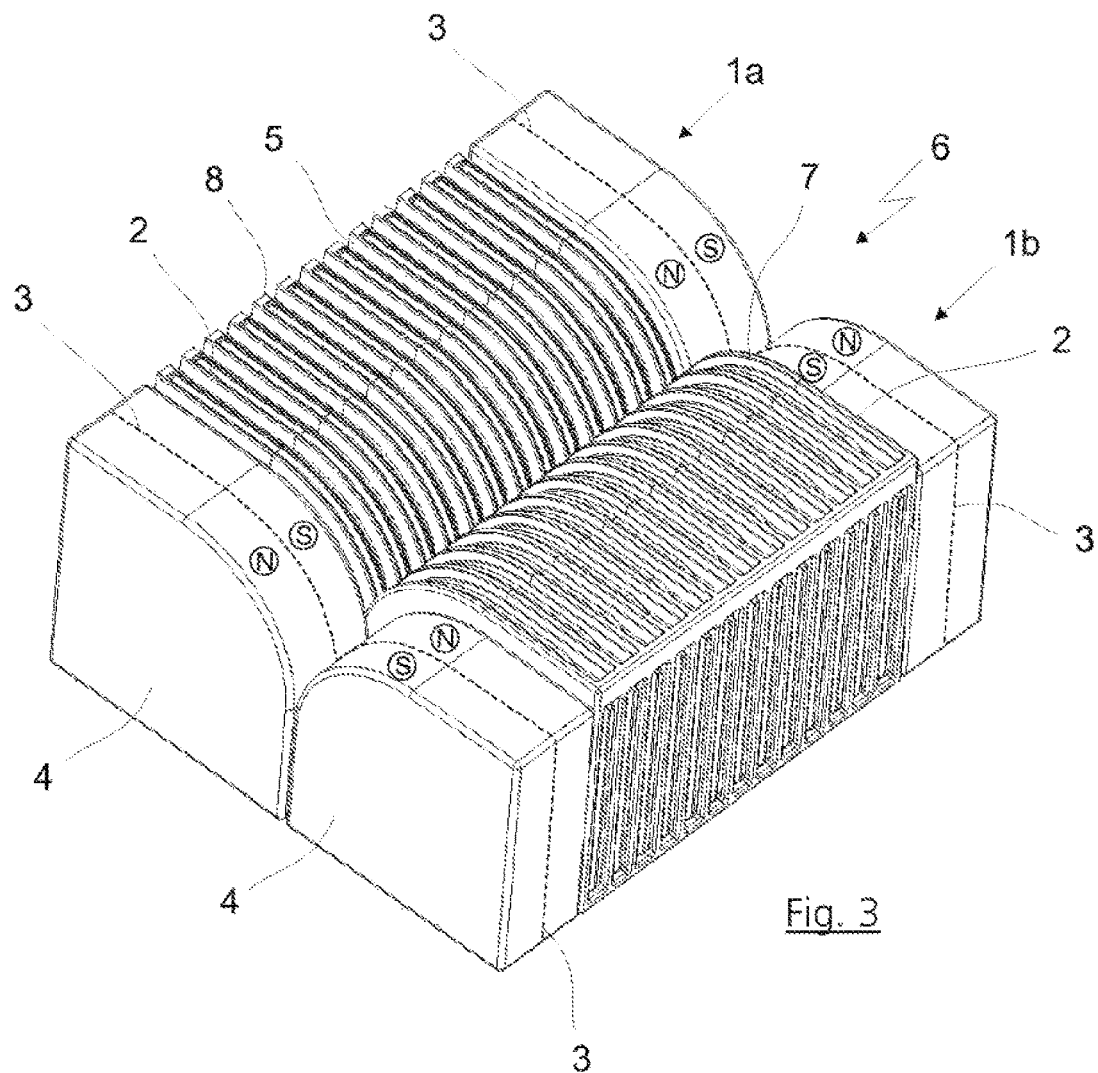
FIG. 3 schematically shows a three-dimensional view of a pair of connections according to FIGS. 1 and 2.

FIG. 3 illustrates how the connection members 1a, 1b in FIGS. 1 and 2 form a pair 6 of connections. In this case, the dovetail connection 9 for attaching the magnet elements 3 to the connection members 1a, 1b is not shown; said dovetail connection can have any desired design. One possible realization can also be performed, for example, by adhesive bonding. The connection members 1a, 1b are magnetically and electrically connected to one another. In addition, a mechanical preliminary guide, in the exemplary embodiment a rough guide, is provided, said mechanical preliminary guide not holding the connection members 1a, 1b together however, but rather performing only a guiding function and preventing an axial movement. The connection members 1a, 1b can initially be roughly brought together by the mechanical rough guide, as a result of which the magnet elements 3 exactly carry out the final contact-connection given the correct orientation which is illustrated in FIG. 3. The coding of the connection members 1a, 1b with the aid of the magnet poles N, S of the magnet elements 3 ensures that the connection members 1a, 1b make contact only in a predetermined orientation and then can be rotated in relation to one another or can roll on one another.

The magnetic and the electrical connection between the connection members 1a, 1b of a pair of connections takes place by means of the casing surface or a partial area of the casing surface of the said connection members. This is correspondingly illustrated in all of the exemplary embodiments. As the connection members 1a, 1b roll on one another, the axes of the connection members 1a, 1b preferably further run parallel in relation to one another.

Figure 1A:
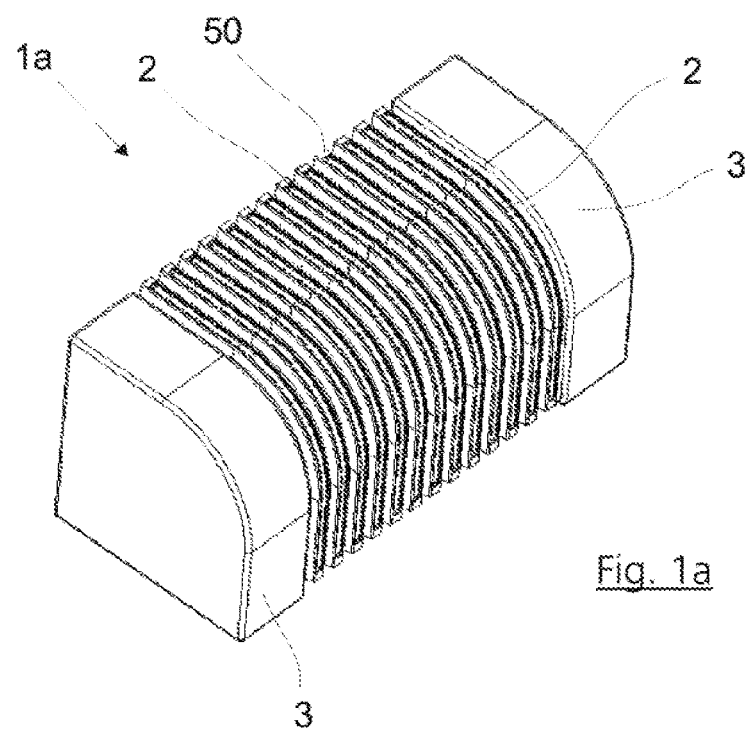
FIG. 1a schematically shows a simplified illustration of the three-dimensional view in FIG. 1.
Figure 2A:
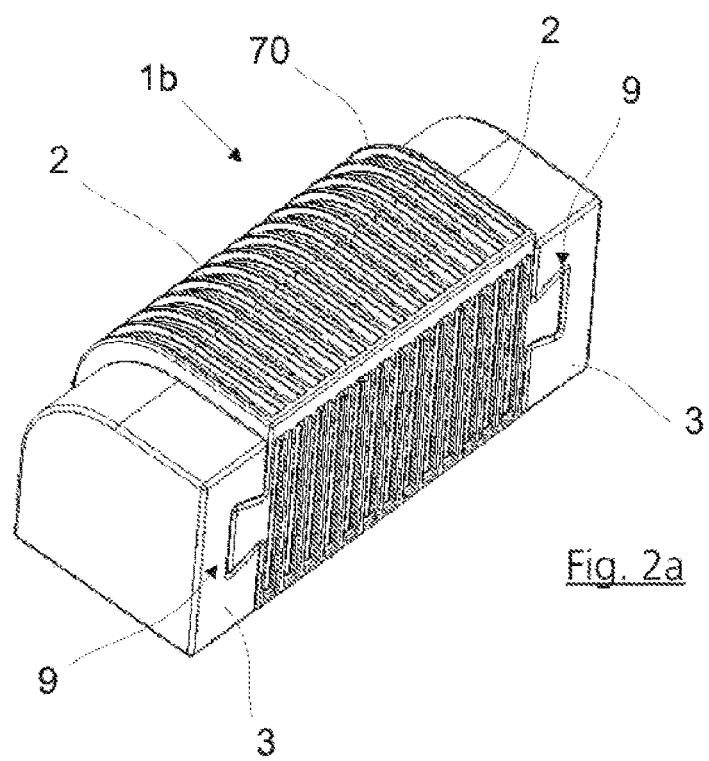
FIG. 2a schematically shows a simplified illustration of the three-dimensional view in FIG. 2.
Figure 3A:
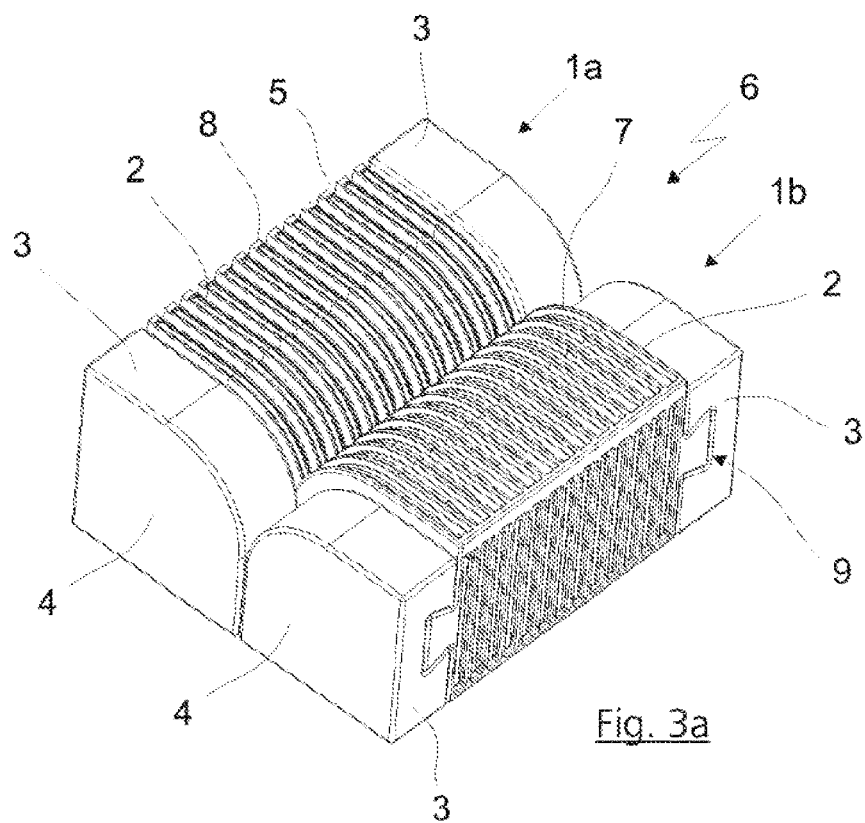
FIG. 3a schematically shows a simplified illustration of the three-dimensional view in FIG. 3.

FIGS. 1a and 2a show simplified views of the illustrations from FIGS. 1 and 2, wherein the dimensions and the magnetic poles N, S are not illustrated. The magnet elements 3 have two poles N, S in each case. FIG. 3a illustrates a simplified view of the connection of the connection members in FIGS. 1a and 2a, wherein the magnet elements 3 can be fastened by means of a dovetail connection 9—illustrated in the said figure.

The connection member 1a according to FIGS. 1 and 1a preferably has a housing 50 which is preferably composed of plastic and which forms the framing elements 8. The housing 50 is indicated in FIG. 1a. The connection member 1b according to FIGS. 2 and 2a preferably has a housing 70 which is preferably composed of plastic and which is indicated in FIG. 2a. In this case, the housing 70 preferably forms the dome-like framing elements 7.

Figures 4A, 4B, 4C:
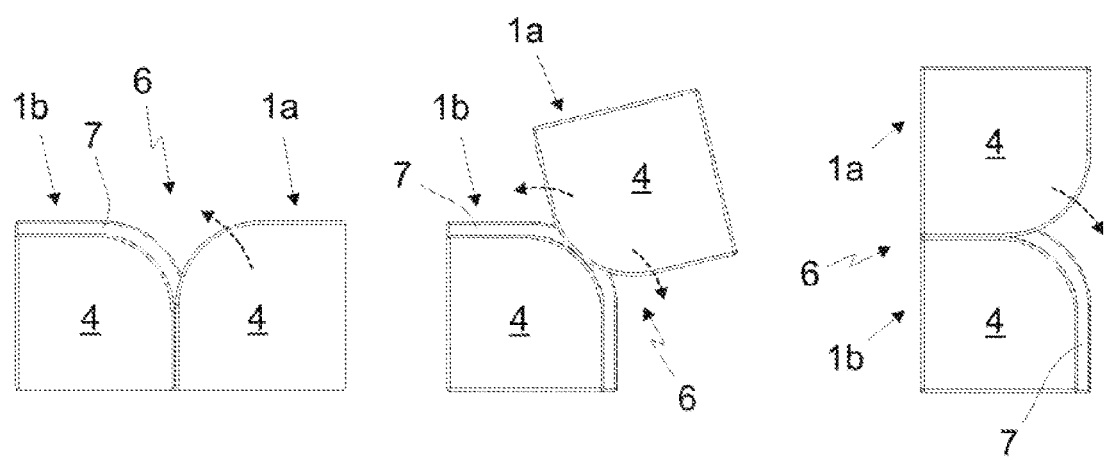
FIG. 4a schematically shows a side view of a pair of connections with a deflection of 0 angular degrees.
FIG. 4b schematically shows a side view of a pair of connections with a deflection of over 90 angular degrees.
FIG. 4c schematically shows a side view of a pair of connections with a deflection of 180 angular degrees.

FIG. 4a shows the side view of a pair 6 of connections. On account of the illustrated cross-sectional areas 4 of the connection members 1a, 1b, it is possible for the said connection members to roll on one another in the form of a circular movement. The profile of a movement of this kind is indicated in FIGS. 4b and 4c which follow. In this case, FIG. 4a shows an alignment of zero angular degrees of the connection members 1a, 1b relative to one another, FIG. 4b shows an alignment of more than ninety angular degrees, and FIG. 4c shows an alignment of one hundred and eighty angular degrees after completion of the entire rolling movement. It goes without saying that the movement is reversible and can be repeated as often as desired. The rotation can also be permanently stopped in any desired angular position. According to the invention, the magnetic or electrical contact-connection is not lost in the process.

The axes of the connection members 1a, 1b remain aligned parallel in relation to one another as the connection members 1a, 1b roll on one another.

Figure 5:
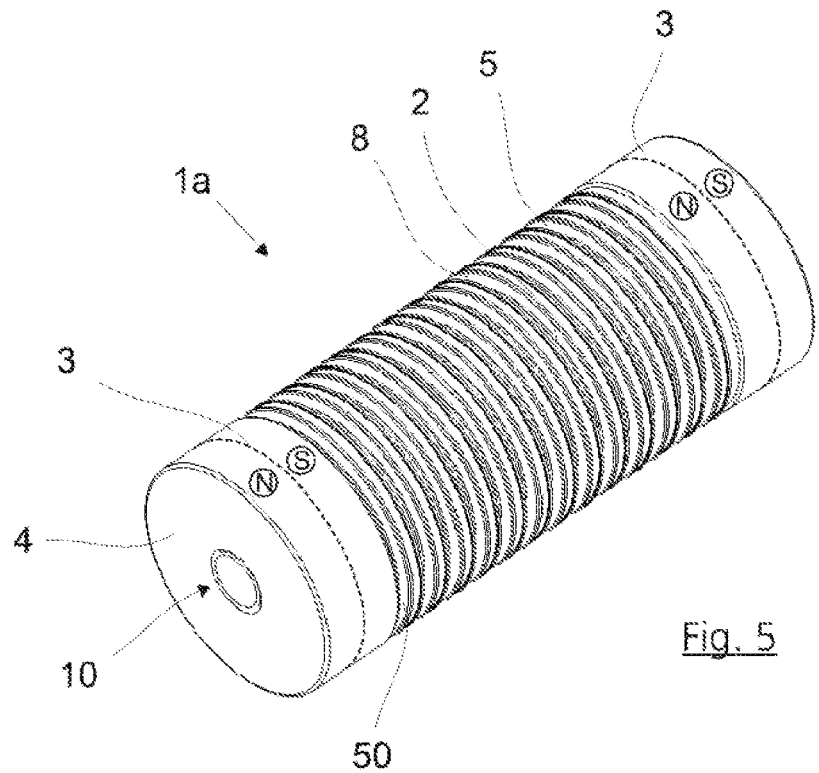
FIG. 5 schematically shows a three-dimensional view of a first connection member of a pair of connections in a second embodiment.
Figure 6:
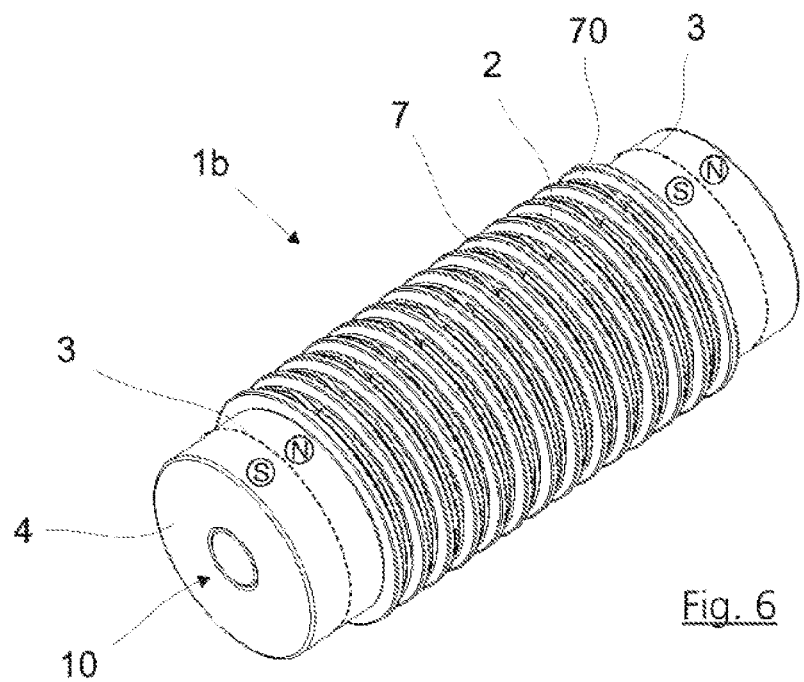
FIG. 6 schematically shows a three-dimensional view of a second connection member of a pair of connections in the second embodiment.
Figure 7:
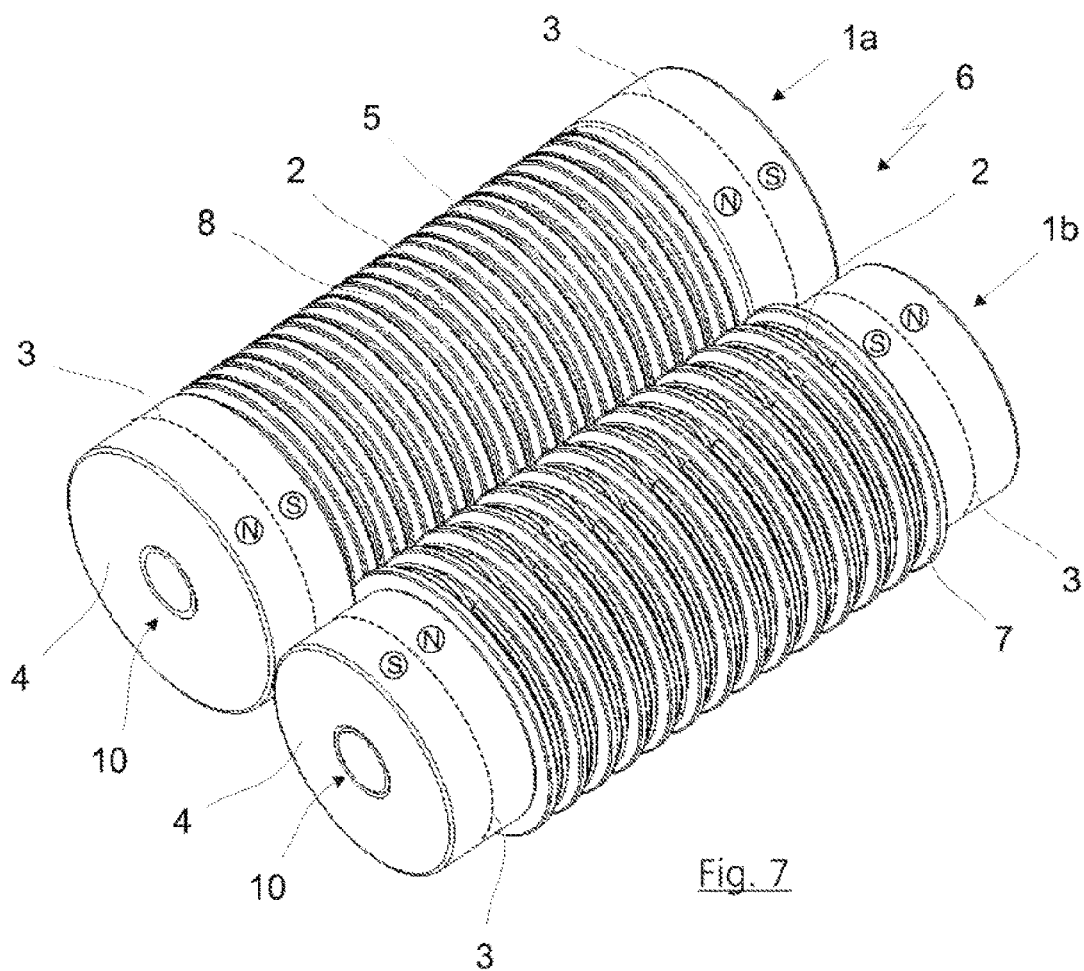
FIG. 7 schematically shows a three-dimensional view of a pair of connections according to FIGS. 5 and 6.

FIGS. 5, 6 and 7 show a second embodiment. The contacts 2 are surrounded by the magnet elements 3 in this example too. The magnet elements 3 are arranged at the ends of the connection members 1a, 1b. However, the connection members 1a, 1b now have a cross-sectional area 4 in the form of a complete circle. The magnet elements 3 are attached to the contact parts of the connection members 1a, 1b by a connection or fastening 10 which can be designed as a round plug connection 10. A mechanical preliminary guide, preferably a rough guide, is once again provided, in which the contacts 2 of the first connection member 1a are surrounded by corresponding recesses 5. The second connection member 1b shown in FIG. 6 has dome-like framing elements 7 in the form of circular areas with larger radii than the cross-sectional area 4. In order to allow connection only in a predetermined orientation, magnet elements 3 are arranged in accordance with FIGS. 1 and 2. In FIG. 6, corresponding contacts 2 are distributed and preferably sprung such that they form an accurate fit with the contacts 2 of the connection member 1a in FIG. 5.

Figure 8:
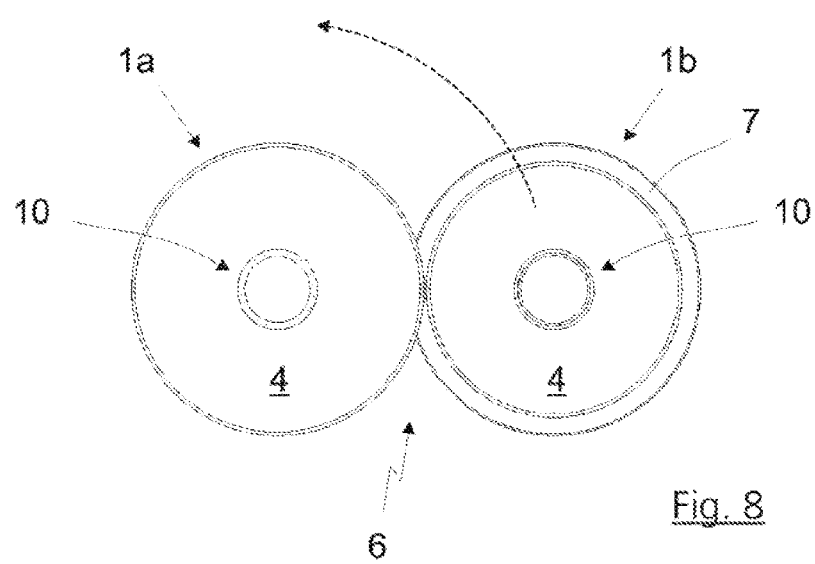
FIG. 8 schematically shows a side view of the pair of connections according to FIG. 7.
Figure 9:
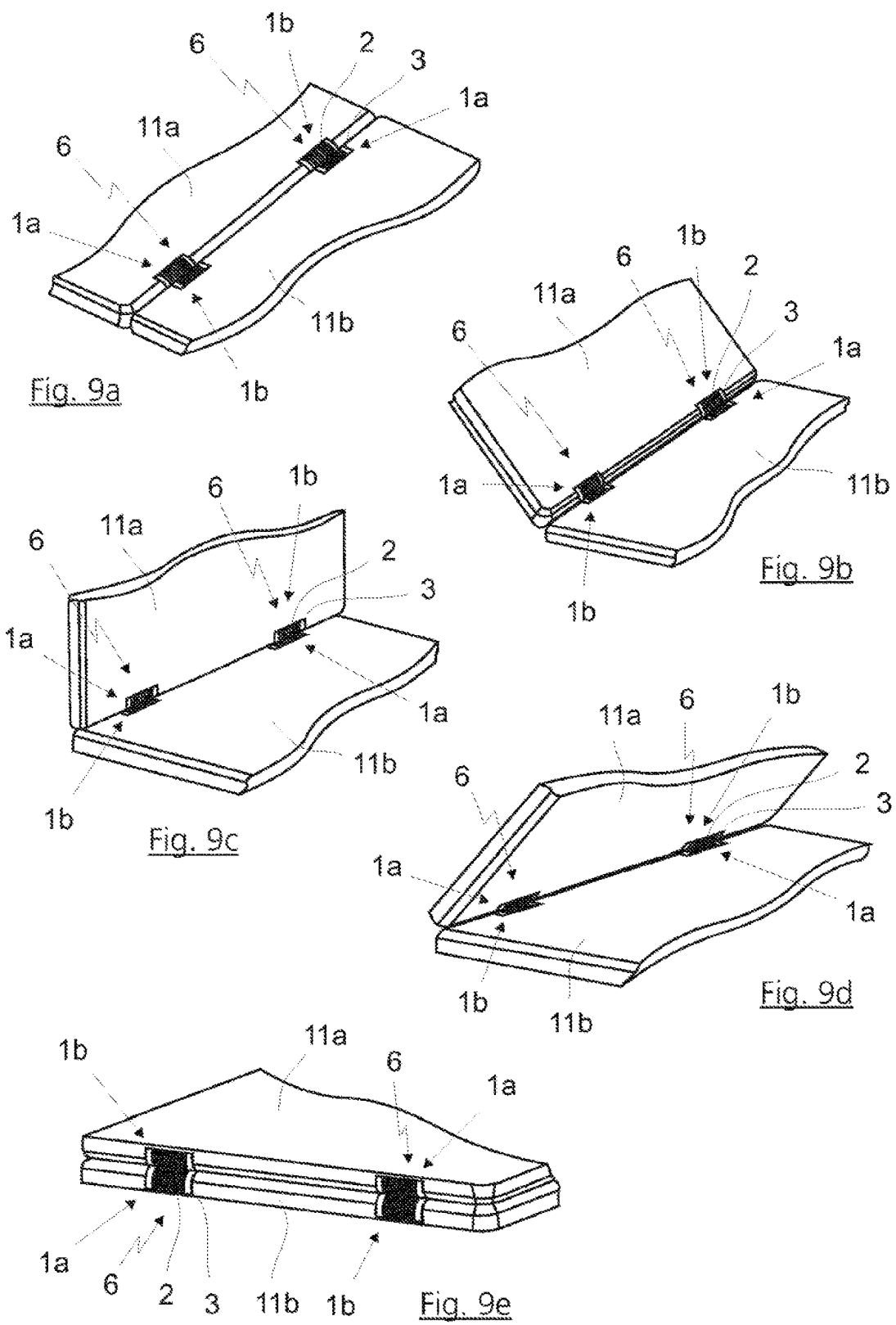
FIG. 9a schematically shows a three-dimensional view of the connection of two units using two pairs of connections with a deflection of 0 angular degrees.
FIG. 9b schematically shows a three-dimensional view of the connection of two units using two pairs of connections with a deflection of 45 angular degrees.
FIG. 9c schematically shows a three-dimensional view of the connection of two units using two pairs of connections with a deflection of 90 angular degrees.
FIG. 9d schematically shows a three-dimensional view of the connection of two units using two pairs of connections with a deflection of 135 angular degrees.
FIG. 9e schematically shows a three-dimensional view of the connection of two units using two pairs of connections with a deflection of 180 angular degrees.

A resulting pair 6 of connections is three-dimensionally illustrated in FIG. 7; FIG. 8 shows a side view. As an extension to the exemplary embodiments according to FIGS. 1 to 4, it is possible in the pair of connections according to FIG. 7 for the connection members 1a, 1b to roll on one another completely, that is to say through up to three hundred and sixty angular degrees and beyond, owing to the complete circular cross section.

In the exemplary embodiment according to FIGS. 5 to 8, provision is preferably also made for the connection members 1a and 1b to roll on one another only over 180 angular degrees, this making it easier to connect the contacts 2 of the connection members 1a, 1b to further units.

The contacts 2 of the connection member 1a are at least partially surrounded by framing elements 8. In this case, the framing elements 8 are enclosed by the dome-like framing elements 7 of the connection member 1b when the dome-like framing elements 7 enter the recesses 5. At least one contact 2 of each pair of contacts is preferably sprung; both contacts of a pair 2 of contacts can also be of sprung design in principle.

The connection member 1a preferably has a housing 50 which is preferably composed of plastic and which forms the framing elements 8. The connection member 1b preferably has a housing 70 which is preferably composed of plastic and which forms the dome-like framing elements 7.

FIGS. 5 to 7 show an arrangement of the two magnet elements 3 in such a way that the first connection member 1a has a north pole at one end and a south pole at the other end.

The second connection member 1b accordingly has a south pole at one end and a north pole at the other end in a complementary manner. This results in it being possible for the connection members 1a, 1b to be closed only in one orientation with magnetic assistance. If the magnet elements 3 are arranged in such a way that the first connection member 1a has a south pole or a north pole at both ends and the second connection member 1b is of correspondingly complementary configuration, a connection of the connection members 1a, 1b in two orientations which are rotated through 180 angular degrees in relation to one another is possible in this case. This may be suitable for certain embodiments.

The connection members 1a, 1b are preferably connected to an electronic unit 11a, 11b or are arranged on the said electronic unit or can be connected to the said electronic unit.

The following units 11a, 11b can preferably be connected by at least one pair 6 of connections:
  (A) two tablets,
  (B) two mobile telephones,
  (C) one tablet and/or one mobile telephone and/or one electronic unit,
  (D) one tablet or one mobile telephone or one electronic unit and a keyboard and/or a screen or a further electronic unit.

A mobile telephone, a tablet or an electronic unit can preferably also be connected to a shell, a docking station, a housing, a cover, a base or a receptacle part.

FIGS. 9a to 9e show an exemplary application of the invention. The said figures show two units 11a, 11b which each preferably have two connection members 1a, 1b. The connection members 1a, 1b preferably have two magnet elements 3 which are preferably arranged at the ends of the connection members 1a, 1b. In this case, the first unit 11a has in each case a first connection member 1a and a second connection member 1b; the second unit 11b is constructed in a complementary manner to the said first unit.

Two pairs 6 of connections are formed overall. The illustrated connection members 1a, 1b are preferably those of the first exemplary embodiment, that is to say the said connection members have a cross section 4 in the form of a square which is rounded at one end. However, the said connection members may also be the connection members 1a, 1b of the second or third exemplary embodiment.

Figure 13:
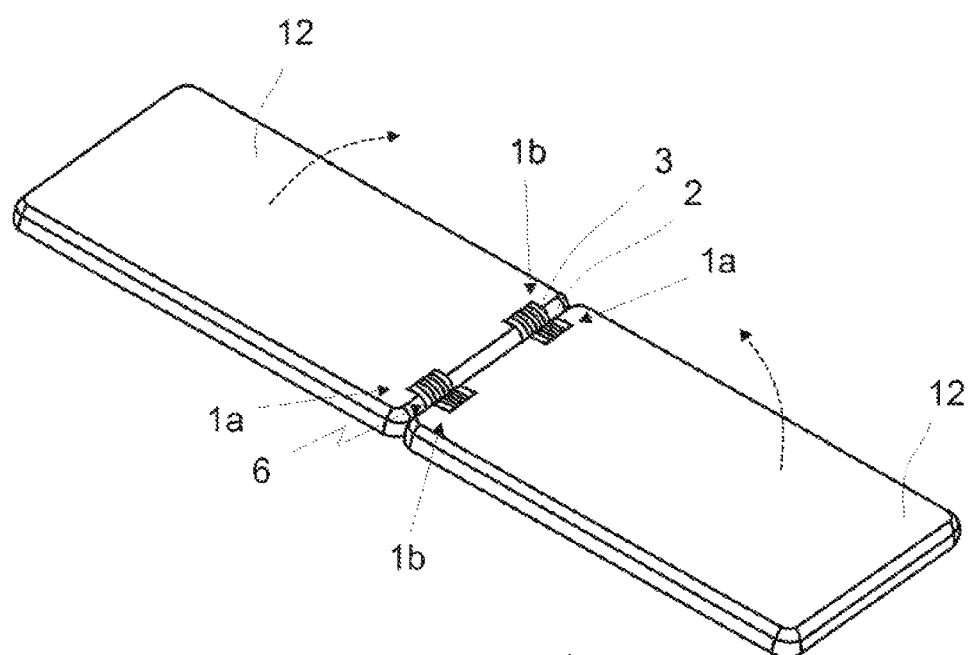
FIG. 13 schematically shows a three-dimensional view of the connection of two mobile telephones and/or tablets by two pairs of connections.

The illustrated units 11a, 11b may be identical units or else different units. Therefore, a connection, for example, between two identical or else different mobile telephones, a mobile computer and a keyboard or docking station or the like can be established. FIG. 13 shows a connection between two identical mobile telephones 12 or tablets.

The connection of the two units 11a, 11b is advantageously flexible owing to the connection apparatus according to the invention. The units 11a, 11b can be rotated relative to one another or can be pivoted in relation to one another in the manner of a hinge or articulation. The course of one possible rotary movement is illustrated starting in FIG. 9a and ending in FIG. 9e. Given a cross-sectional area 4 according to the first embodiment of the connection members 1a, 1b, rotation through up to one hundred and eighty angular degrees of the elements 11a, 11b relative to one another is possible in this case—as illustrated.

Any desired number of connection members 1a, 1b can be provided in the units 11a, 11b. It is also possible to use only one connection member 1a or 1b per unit, or else more than two connection members 1a, 1b. Corresponding arrangement of the connection members 1a, 1b, preferably symmetrically or possibly also asymmetrically, and corresponding arrangement of the magnet elements 3 on the connection members 1a, 1b can result in the magnetic connection apparatus only assisting the connection of the units 11a, 11b in one orientation or a connection also being possible in two orientations (rotated through 180 angular degrees in relation to one another), so that the alignment of the units 11a, 11b can be varied, wherein rotation of the units 11a, 11b in relation to one another (as illustrated in FIGS. 9a to 9e) is possible in both cases.

The unit 11a can have connection members 1a, connection members 1b or a mixture, as already described above, of the connection members 1a, 1b. The unit 11b can be equipped in a correspondingly complementary manner.

Particularly for connecting two physically identical units, it is advantageous when each unit has one connection member 1a and one connection member 1b, so that the units can be combined.

Figure 10:
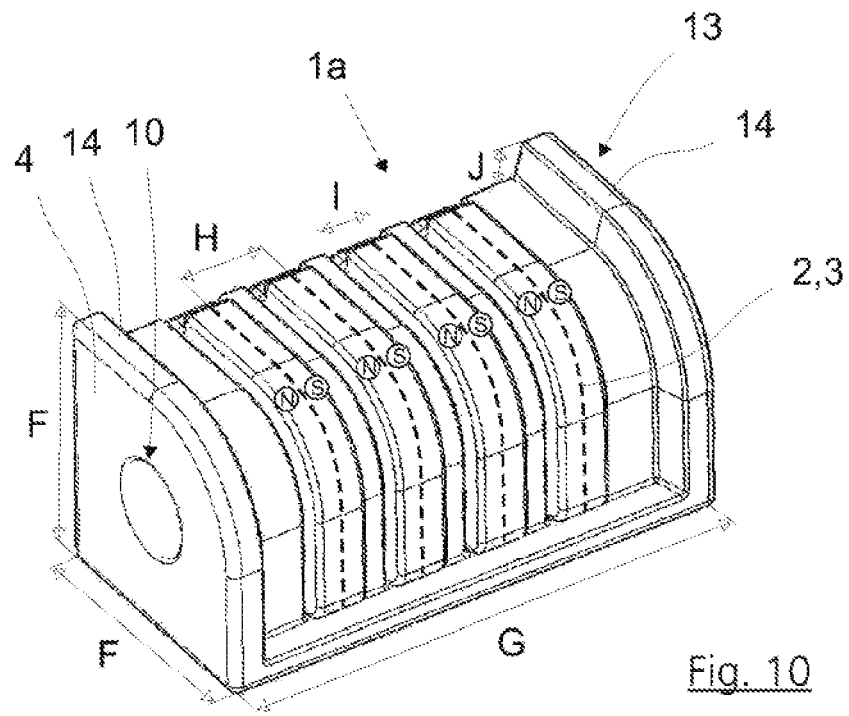
FIG. 10 schematically shows a three-dimensional view of a first connection member of a pair of connections in a third embodiment.

FIG. 10 shows a third embodiment for a first connection member 1a. In this example, a cross-sectional area 4 in the form of a square with one rounded corner is again used. The said figure shows a possible way of forming the contacts 2 as magnet elements 3. In this case, the contact or magnet elements 2, 3 are surrounded by a mechanical preliminary guide, preferably a rough guide 13, which, in addition to its function as a frame, can serve to simultaneously protect all of the contacts 2 against short circuits. The said figure shows an embodiment with four contacts 2. This embodiment is particularly suitable for forming a USB plug connection.

Figure 11:
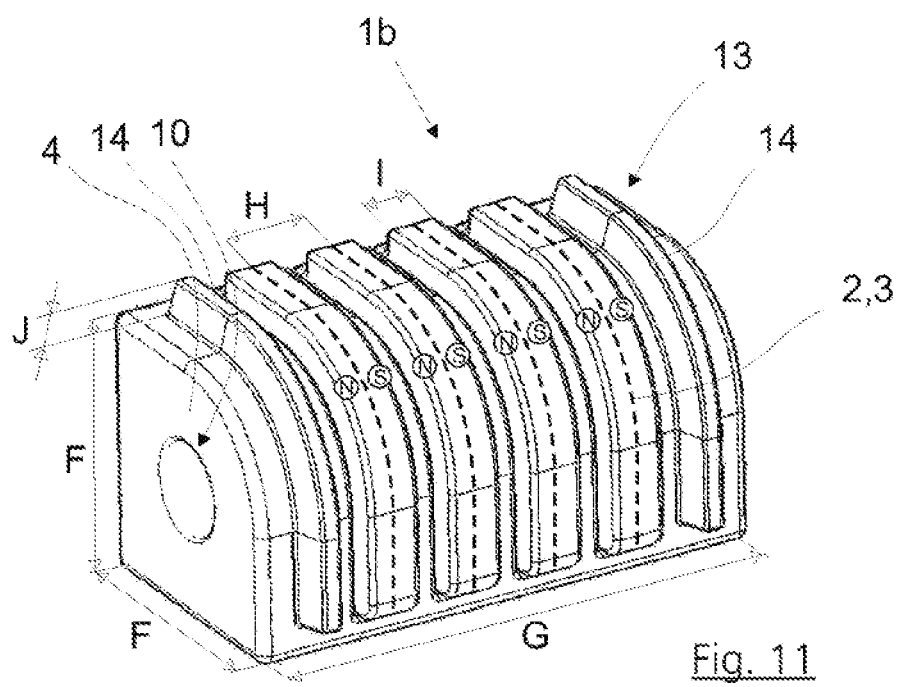
FIG. 11 schematically shows a three-dimensional view of a second connection member of a pair of connections in the third embodiment.

The mating piece to the first connection member 1a which is shown in FIG. 10, the second connection member 1b, is illustrated in FIG. 11. In this case, the second connection member 1b is formed in such a way that its mechanical and magnetic guide complements that of the first connection member 1a.

Figure 12:
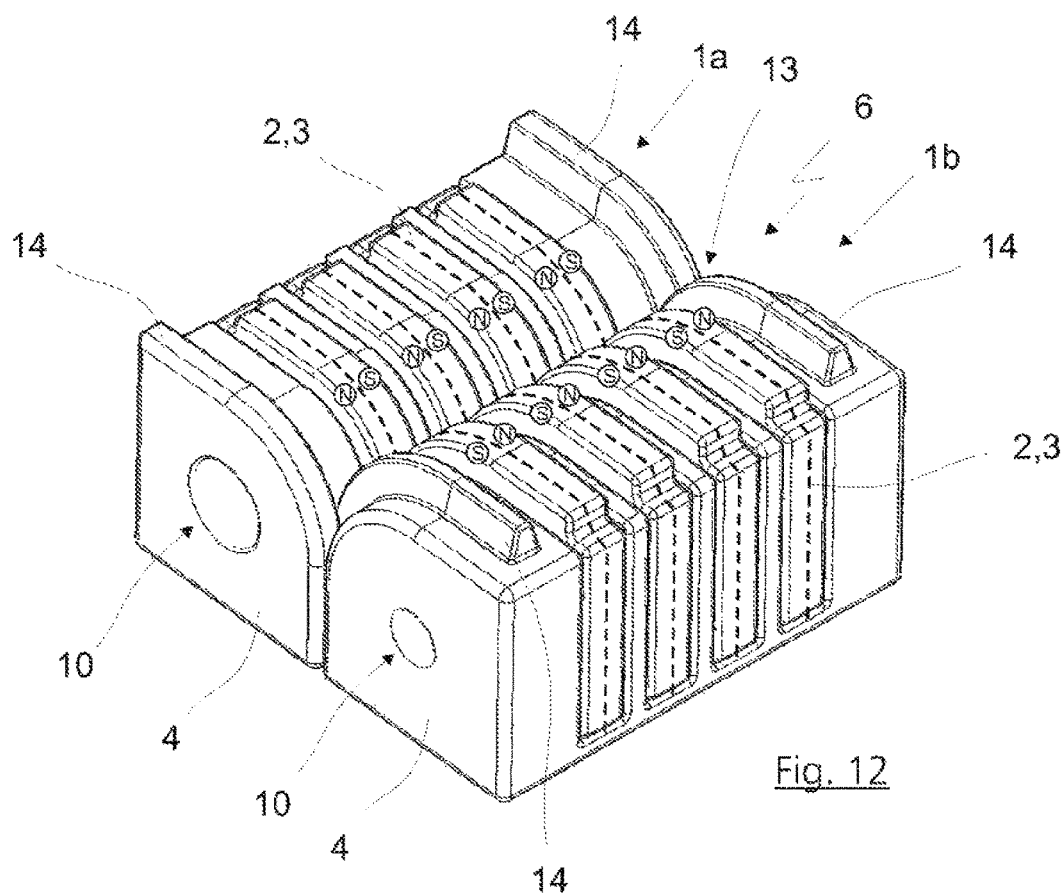
FIG. 12 schematically shows a three-dimensional view of a pair of connections according to FIGS. 10 and 11.

As shown by FIGS. 10 to 12, the contacts 2 or magnet elements 3 are each uniformly oriented on the respective connection members 1a, 1b in such a way that the north and, respectively, south poles of all of the magnet elements 3 of a connection member 1a and, respectively, 1b are located on the same side. Other configurations in order to achieve a different coding are also possible here. In addition, it is possible for not all of the contacts 2 to be magnetic in the exemplary embodiment according to FIGS. 10 to 12. It may be advantageous, in particular, when only the power or earth contacts are magnetic, in order to avoid interference. Furthermore, yet further data or signal contacts may also optionally be magnetic, in particular when slow data transmission is provided and interference is less probable. In addition, as illustrated in the first and second embodiments of the connection members 1a, 1b, yet further magnet elements 3, which are not provided for making electrical contact, can also be added to the exemplary embodiment according to FIGS. 10 to 12.

As is further shown by FIGS. 10 to 12, the mechanical rough guide 13 for preliminary positioning or for rough positioning is provided in order to prevent an axial movement of the connection members 1a, 1b in relation to one another. Axial positioning can therefore be performed in a simple manner by the mechanical rough guide, while the retaining force between the connection members 1a, 1b, in particular in the radial direction, is provided by the magnetic force. The elements of the connection members 1a, 1b which form the mechanical rough guide 13 are in the form of raised portions 14 which are in the form of part of a ring. The contour of the raised portions 14 which are in the form of part of a ring substantially follows the bent profile of the casing surface or surface of the connection members 1a, 1b, that is to say the said raised portions have an arcuate profile (in the form of part of a ring) which ends in a straight line at the ends. The two raised portions 14, which are in the form of part of a ring, of the first connection member 1a are formed at the ends of the connection member. The two raised portions 14, which are in the form of part of a ring, of the second connection member 1b are moved inward approximately by the thickness of the raised portions 14, which are in the form of part of a ring, of the first connection member 1a from the ends, so that the raised portions 14, which are in the form of part of a ring, of the two connection members 1a, 1b are situated next to one another when the connection members 1a, 1b are electrically and magnetically connected to one another. Forming two pairs of mechanical connections of this kind prevents displacement of the connection members 1a, 1b in both axial movement directions.

Although it is readily possible for a person skilled in the art to vary the connection members 1a, 1b and the sizes of their constituent parts in any desired manner, some particularly advantageous dimensions are cited in the text which follows. The height and width F of the cross-sectional area 4 of the first connection member 1a can be, for example, approximately 7.5 mm. The height and width F of the cross-sectional area 4 of the second connection member 1b is likewise approximately 7.5 mm. The length G of a connection member 1a, 1b can be approximately 15 mm. The distance H between the centre line of two contacts 2 or magnet elements 3 can be approximately 2.5 mm. The width I of a contact 2 or magnet element 3 can be approximately 1.5 mm. The projecting portion J by which the raised portion 14 which is in the form of part of a ring projects beyond the casing surface can preferably be approximately 1 mm. In this case, the distance is selected in such a way that, when the two connection members 1a, 1b are plug connected, the contacts 2 of the connection members 1a, 1b make contact with one another. This is assisted by a magnetic configuration of the contacts 2. Furthermore, provision can be made for one or both contacts 2 of a pair 2 of contacts to be mounted in a radially sprung manner.

The dimensions in FIGS. 1, 2, 10 and 11 are particularly advantageous but the embodiments are not restricted to those. The dimensions can differ by in particular +/−80%, preferably +/−50% and very particularly preferably +/−20%.

FIG. 12 illustrates the formation of a pair 6 of connections of the connection members 1a, 1b of the third embodiment in FIGS. 10 and 11 by way of example.

The units 11a, 11b which are illustrated in FIGS. 9a to 9e can also be equipped with the connection members 1a, 1b of the third embodiment, in particular also with the number of contacts 2 selected in the said embodiment.

FIG. 13 illustrates what a connection of two mobile telephones 12 or two tablets by two pairs 6 of connections can look like. The said figure shows an embodiment in which the connection members 1*a*, 1*b* have a cross section 4 according to the first or the third embodiment of the connection members 1*a*, 1*b*, and wherein in each case four contacts 2 are surrounded by magnet elements 3 which are arranged at the ends. According to the invention, it is possible to move the mobile telephones 12 toward one another in the direction of the arrows. There is therefore an articulated or rotatable connection. In particular, it would be feasible to electronically couple the mobile telephones 12 in such a way that the display area of one mobile telephone 12 can be extended to the display area or the display of the second mobile telephone 12. In this case, it would be possible, for example, to fold the mobile telephones 12 together in such a way that they are situated with their rear faces against one another, wherein the respective displays of the mobile telephones 12 face outward. This would, in particular, create a display device which has a display on both sides.

What is claimed is:

1. A magnetic connection apparatus for connecting two units, said apparatus comprising:
    a first connection member having a first casing surface, at least one first magnetic element, a plurality of first electrical contacts and a first mechanical guide element, said first electrical contacts being mutually spaced from one another in an axial direction;
    a second connection member having a second casing surface, at least one second magnetic element, a plurality of second electrical contacts and a second mechanical guide element, said first mechanical guide element cooperating with said second mechanical guide element to (i) mechanically guide said first connection member and said second connection member as said first connection member and said second connection member are moved relatively toward one another from a disconnected state into a contact-connected state and (ii) limit relative displacement of the first connection member and the second connection member in the axial direction; said contact-connected state being a state in which each of said second electrical contacts is in electrical contact with a corresponding one of said first electrical contacts and said second magnetic element and said first magnetic element provide a magnetic force which assists said electrical contact and said first casing surface and said second casing surface are in contact with one another in an area;
    said area, said first magnetic element, said second magnetic element, said first electrical contacts and second electrical contacts having matching profiles which permit said first connection member and said second connection member to roll on one another along said first casing surface and said second casing surface and assume different relative orientations while continuously maintaining said contact-connected state.

2. A magnetic connection apparatus as claimed in claim 1, wherein said first magnetic element comprises a permanent magnet.

3. A magnetic connection apparatus as claimed in claim 2, wherein said first magnetic element and said second magnetic element are aligned in respect of their polarity in such a way that said first connection member and said second connection member magnetically attract only in a predetermined orientation of the first unit to the second unit.

4. A magnetic connection apparatus as claimed in claim 2, wherein said first magnetic element and said second magnetic element each have at least two magnets.

5. A magnetic connection apparatus as claimed in claim 1, wherein at least one of said first casing surface and said second casing surface is curved and/or arcuate manner and/or has a radius.

6. A magnetic connection apparatus as claimed in claim 5, wherein said first connection member and said second connection member are rod-like members.

7. A magnetic connection apparatus as claimed in claim 6, wherein said first connection member has an end having a said first magnetic element, and said plurality of first electrical contacts are arranged between said magnet first magnetic elements.

8. A magnetic connection apparatus as claimed in claim 1, wherein said area has a length and wherein said first electrical contacts and/or said first magnetic elements run in a curved and/or arcuate manner and/or have a radius in a rolling direction of the said connection members at least over said length of said area.

9. A magnetic connection apparatus as claimed in claim 2, wherein said first magnetic element and said second magnetic element are cylindrical.

10. A magnetic connection apparatus as claimed in claim 1, wherein at least one of said first electrical contacts is magnetic and serves as said first magnetic member.

11. An electronic system having at least one first unit and at least one second unit, wherein said first unit and said second unit are connected by means of a magnetic connection apparatus as claimed in claim 1.

* * * * *